United States Patent Office 3,290,416
Patented Dec. 6, 1966

3,290,416
METHACRYLATE POLYMER COATING COMPOSITION MODIFIED WITH AN ALKYLENIMINE
Roger M. Christenson, Gibsonia, Samuel Porter, Jr., Tarentum, and Andrew Halcoussis, Pittsburgh, Pa., assignors to Pittsburgh Plate Glass Company, Pittsburgh, Pa., a corporation of Pennsylvania
No Drawing. Filed June 22, 1964, Ser. No. 377,119
19 Claims. (Cl. 260—901)

This invention relates to coating compositions containing polymerized alkyl methacrylates, and more particularly to such compositions modified to improve their properties by the inclusion of imine-reacted acidic groups.

Polymers of alkyl methacrylates, and particularly homopolymers and copolymers of methyl methacrylate, are widely used in formulating coating compositions for various articles. One especially extensive use is in providing finishes for automobiles and other vehicles.

Coatings based on such polymers have many outstanding properties, including excellent gloss retention, durability, and the like, particularly on outdoor exposure. However, these materials have a serious deficiency in that they adhere poorly to many substrates, including glass, metals, and thermosetting primers, such as conventional sheet metal primers. For this reason, it is usually necessary, and especially in automotive coatings, to employ a primer. The primer is then sanded and a sealer is applied, prior to the application of the finish coat.

It has now been discovered that the adhesion of coatings based on alkyl methacrylate polymers can be greatly improved by the inclusion of a small proportion of acidic units in the polymeric vehicle and reacting these acidic groups with an alkylenimine or a substituted alkylenimine. Coatings in which such imine-modified acid units are included in the film-forming component have exceptional adhesion to most surfaces, including metals, glass, and conventional primer coatings, including thermosetting primers. When used over conventional primers, such as those based on alkyd resins, epoxy resins, or aminoplast resins, these coating compositions do not require a sealer, nor is it necessary to employ the sanding or other expedients normally required to obtain adequate adhesion of conventional methyl methacrylate lacquers and similar finishes.

The coating compositions of this invention contain as the chief film-forming component of the vehicle thereof a polymeric component containing at least about 50 percent by weight of a lower alkyl methacrylate in polymerized form, and at least about 0.1 percent by weight of imine-modified polymerized acidic carboxyl units, based upon the amount of methacrylate polymer. Methyl methacrylate is greatly preferred as the methacrylate, but other lower alkyl methacrylates, such as ethyl methacrylate, propyl methacrylate, and butyl methacrylate, can also be used in whole or in part.

The imine-modified acidic units are provided by a vinyl-polymerized ethylenic acid monomer, which is either interpolymerized along with a lower alkyl methacrylate or included in a homopolymer or interpolymer blended with a polymer of a lower alkyl methacrylate (which may also contain part of the total desired acidic units). The acidic units are reacted with an imine, as described below, the reaction being carried out with the acid-containing polymer, or with the acidic groups prior to or during the polymerization. When the acidic units are part of an interpolymer of the unsaturated acid to be blended with the methacrylate polymer, there may be included in the acid-containing interpolymer any copolymerizable co-monomer or comonomers. A reasonable degree of compatibility between the acid-containing interpolymer and the methacrylate polymer is, of course, desirable, although not always necessary. This is one reason that it is preferred to include a methacrylate in the acid-containing interpolymer; this methacrylate is preferably, but not necessarily the same as the methacrylate in the methacrylate polymer.

Regardless of whether the acidic units are blended or interpolymerized with the methacrylate units to produce the polymeric vehicle, the acid provides at least about 0.1 percent, and preferably about 0.25 percent to about 5 percent, of the total weight. More than about 10 percent is not generally desirable, but can be used in certain instances.

The acid employed to provide the acidic units can be any polymerizable monocarboxylic or polycarboxylic acid, preferably having from 3 to 6 carbon atoms. An acrylic acid is preferred, using this term to include acrylic acid, methacrylic acid, and similar alpha-substituted acrylic acids. Also quite useful are maleic acid and fumaric acid, as well as the half-esters of such dicarboxylic acids, for example, monobutyl maleate. Other acids, such as crotonic acid, 3-butenoic acid, tiglic acid, and itaconic acid and its half-esters, can also be used, as can various longer chain carboxylic acids containing polymerizable groups. Certain copolymerizable fatty acids, such as dehydrated castor oil acids and the like, may also be employed.

Various alkylenimines and substituted alkylenimines can be used to modify the acidic groups. These correspond generally to the formula:

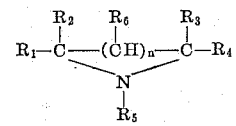

where $R_1$, $R_2$, $R_3$, $R_4$ and $R_5$ are each either hydrogen; alkyl, such as methyl, ethyl, propyl, or the like, having, for example, up to about 20 carbon atoms; aryl, such as phenyl or the like; alkaryl, such as tolyl, xylyl or the like; or aralkyl, such as benzyl, phenethyl or the like. $R_6$ in the above formula is hydrogen or a lower alkyl radical usually having not more than about 6 carbon atoms, and $n$ is an integer from 0 to 1.

It is intended that the groups designated by the above formula include substituted radicals of the classes indicated, including substituents such as cyano, halo, amino, hydroxy, alkoxy, carbalkoxy, and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, one and usually several of the groups designated by $R_1$ through $R_6$ will represent hydrogen. However, the efficacy of the various imines within the above formula does not depend upon the particular nature of any of the substituents and thus, beneficial results are obtained with interpolymers modified by any of those compounds within the above class.

To exemplify the nature of the materials which fall within the scope of the formula set forth above, a number of specific alkylenimines are as follows:

Ethylenimine (aziridine)
1,2-propylenimine (2-methl aziridine)
1,3-propylenimine (azetidine)
1,2-dodecylenimine (2-decyl aziridine)
1,1-dimethyl ethylenimine (2,2-dimethyl aziridine)
Phenyl ethylenimine (2-phenyl aziridine)

Tolyl ethylenimine (2-(4-methylphenyl)aziridine)
Benzyl ethylenimine (2-phenylmethyl aziridine)
1,2-diphenyl ethylenimine (2,3-diphenyl aziridine)
Hydroxyethyl ethylenimine (2-(2-hydroxyethyl)aziridine)
Aminoethyl ethylenimine (2-(2-aminoethyl)aziridine)
2-methyl propylenimine (3-methyl azetidine)
3-chloropropyl ethylenimine (2 - (3-chloropropyl)aziridine)
p-Chlorophenyl ethylenimine (2 - (4-chlorophenyl)aziridine)
Methoxyethyl ethylenimine (2-(2-methoxyethyl)aziridine)
Dodecyl aziridinyl formate (dodecyl 1-aziridinyl carboxylate)
Carbethoxyethyl ethylenimine (2-(2-carbethoxyethyl)aziridine)
N-ethyl ethylenimine (1-ethyl aziridine)
N-butyl ethylenimine (1-butyl aziridine)
N-(2-aminoethyl)ethylenimine (1 - (2-aminoethyl)aziridine)
N-(phenethyl)ethylenimine (1-(2-phenylethyl)aziridine)
N-(2-hydroxyethyl)ethylenimine (1-(2-hydroxyethyl)aziridine)
N-(cyanoethyl)ethylenimine (1-cyanoethyl aziridine)
N-phenyl ethylenimine (1-phenyl aziridine)
N-tolyl ethylenimine (1-(2-methylphenyl)aziridine)
N-(p-chlorophenyl)ethylenimine (1-(4-chlorophenyl)aziridine)

Because of their availability and because they have been found to be among the most effective, the preferred imines are alkylenimines having 2 to 4 carbon atoms, and especially ethylenimine and 1,2-propylenimine.

The reaction with the imine takes place upon admixing the imine and the carboxyl-containing material and heating to moderate temperatures, say 50° C. to 150° C., although higher or lower temperatures can be used, depending upon the desired reaction time. The imine reacts with the acidic carboxyl groups, but the exact nature of the reaction which takes place under these circumstances and the structure of the product obtained are not known with certainty. In the case of the preferred ethylenimine and 1,2-propylenimine, the reaction, to some extent at least, involves the production of a primary amino group, which has been hitherto unobtainable in this class of material. Provided that at least some imine-modification is attained, the improved properties are achieved when all or part of the carboxyl groups present are reacted with the imine, the extent of reaction being based upon the amount of imine employed. It is only necessary that at least about 0.1 percent by weight of acidic units, based upon the total methacrylate polymer or polymers, be reacted with imine.

The reaction with the imine is preferably carried out during or after the polymerization of the alkyl methacrylate. While often the imine reaction is carried out after the acid-containing polymer has been produced, it has been found that some saving of time without any sacrifice in properties is achieved by carrying out the reaction with imine concurrently with the polymerization reaction. This is particularly true when all or a substantial part of the methacrylate is included with the acid. In this embodiment, the imine is added to the polymerization mixture at any point prior to the completion of the polymerization reaction. Preferably, the imine is added after the monomers but before the polymerization is substantially advanced.

The polymerization reaction itself is otherwise carried out in conventional manner, utilizing heat and/or catalysts and varying solvents and techniques. Generally, a free-radical catalyst, such as cumene hydroperoxide, benzoyl peroxide or similar peroxygen compound, or an azo compound, is employed. When the polymerization reaction and the reaction with imine are conducted concurrently as described above, azo compounds and especially alpha, alpha′-azobis(isobutyronitrile) is preferred as the catalyst.

While any carboxyl-containing polymer can be utilized to provide the imine-modified groups in the coating composition, it is preferred to employ an interpolymer in which the acidic monomer is interpolymerized with all or part of the methacrylate monomer. These preferred interpolymers contain from about 30 percent to about 99.9 percent by weight of a lower alkyl methacrylate, preferably methyl methacrylate, although others such as ethyl methacrylate, propyl methacrylate, butyl methacrylate, amyl methacrylate, and hexyl methacrylate can also be included. Interpolymerized with the alkyl methacrylate is at least about 0.1 percent by weight of an ethylenically unsaturated carboxylic acid and, optionally, about 0 percent to about 69.9 percent by weight of one or more other ethylenically unsaturated monomers copolymerizable with the methacrylate and acid. As described, the interpolymer is modified by reaction of all or some of the acidic carboxyl groups introduced therein from the acid monomer with an imine.

Among the comonomers which can be employed in making the preferred acid and methacrylate-containing interpolymers are the various ethylenically unsaturated monomers which are copolymerizable with the lower alkyl methacrylates. These include such compounds as acrylonitrile, methacrylonitrile, styrene, vinyl toluene, and similar monomers. Often employed as comonomers are ethyl acrylate, butyl acrylate, 2-ethylhexyl acrylate, and other esters of acrylic acid with alcohols having 1 to 18 or more carbon atoms. Other methacrylic acid esters, for example, those of alcohols having 2 to 20 carbon atoms, can also be advantageously employed as comonomers with methyl methacrylate or other alkyl methacrylate in the interpolymer.

In certain instances, it is desirable to include a hydroxyalkyl ester in the methacrylate polymer, as where it is desired to obtain some curing of the polymer with cross-linking polymers, such as melamine-formaldehyde resins or other aminoplast resins, or for other purposes. The preferred hydroxyalkyl esters employed as comonomers include hydroxyethyl acrylate, hydroxypropyl acrylate, hydroxyethyl methacrylate, and hydroxypropyl methacrylate, although others such as the corresponding esters of ethacrylic acid, crotonic acid, and other acids of up to about 6 carbon atoms can also be used. There may also be employed other hydroxyalkyl esters, such as hydroxybutyl and hydroxylauryl esters, as well as mono and diesters of ethylenic dicarboxylic acids, such as hydroxyethyl hydrogen maleate, bis(hydroxypropyl) fumarate, and butyl hydroxyethyl maleate.

The imine-modified interpolymers preferred herein may be themselves utilized as the sole methacrylate polymer of the coating composition, or they may be blended with a non-imine-modified polymer of methyl methacrylate or other lower alkyl methacrylate. Two or more imine-modified polymers can also be blended, to provide the over-all desired composition. When a blend with an unmodified polymer is used, the proportion of imine-modified interpolymer can be varied widely and can comprise as low as 1 percent or less by weight of the combined polymers, although, of course, the extent of improvement in adhesion depends upon the proportion of imine-modified groups relative to the methacrylate polymer or polymers. As indicated, 0.1 percent by weight of acidic groups, which are then imine-modified, is sufficient for many purposes.

When employed as the sole methacrylate polymer in formulating a coating composition, interpolymers of methyl methacrylate are preferred and there may be employed lower levels of imine-modification and, consequently, lower acid levels, e.g., 0.1 percent to 10 percent. When the modified interpolymer is to be blended with another methacrylate polymer, the interpolymer is advantageously produced using other lower alkyl methacrylates and higher acid levels, for example, from 5 percent to 50 percent or higher. Thus, for example, blending 10 percent of an imine-modified interpolymer of 70 percent methyl methacrylate, 20 percent butyl methacrylate and 10 percent methacrylic acid, with poly(methyl methacrylate), a polymeric mixture having properties comparable to an interpolymer of the same overall composition is attained.

The unmodified methacrylate polymers that are blended with the imine-modified interpolymers include any of the various polymers of lower alkyl methacrylates, including homopolymers of methyl methacrylate and other lower alkyl methacrylates, as well as copolymers of such methacrylates with minor amounts of other ethylenically unsaturated monomers. The comonomers employed in the unmodified methacrylate polymer can be, for example, any of those mentioned above as optionally included in the imine-modified interpolymer. Preferred classes of such polymers containing methyl methacrylate are methyl methacrylate homopolymers and copolymers of methyl methacrylate and other alkyl methacrylates having about 2 to 12 carbon atoms in the alkyl group.

The interpolymers and blends described above are used as a film-forming component of pigmented or unpigmented coating compositions, and may include in the composition any of the various pigments employed with such materials, as well as solvents, plasticizers, fillers, additives, and the like. They are employed, for example, in pigmented automotive lacquers, including pastel and polychromatic lacquers, in which colored and metallic pigments and various plasticizers and additives are conventionally included. The coating compositions are applied by conventional means, preferably by spraying, and are dried in the usual manner, usually by baking at temperatures of 180° F. to 300° F. for 10 to 30 minutes, although in some cases the compositions are air-dried at ambient temperatures.

Such coating compositions can be applied to virtually any solid substrate with advantageous results. For example, these include glass, wood, hardboard, plastics, and various metals such as steel, treated steels, aluminum, and the like. Compositions containing the modified interpolymers described herein are particularly useful when applied over primer coatings such as are used in priming sheet metal employed in the fabrication of automobiles and similar articles. Such primers are generally thermosetting or otherwise curable, i.e., cross-linkable.

Most often these primers include an alkyd resin in whole or in part, suitable alkyds being glycerol or other polyhydric alcohol polyesters of phthalic anhydride or similar polybasic acids, which may be modified with a drying or semi-drying oil, such as linseed oil, tung oil, soya oil, dehydrated castor oil, or the like, or with the corresponding fatty acids. A typical alkyd resin employed contains 39.1 percent glycerol ester of dehydrated castor oil, 2.4 percent glycerol ester of p-tertiary butyl benzoic acid, 55 percent glycerol phthalate and 3.5 percent excess glycerine.

The primer may also include an epoxy resin, i.e., a polyepoxide, or an epoxy resin fatty acid ester, or the epoxy resin or ester may be utilized alone as the primer vehicle. Epoxy primers are disclosed, for example, in United States Patent No. 2,847,323. Epoxy resins typically employed include the bisphenol A-epichlorohydrin condensation products having epoxide equivalents of 175 to 4000 and molecular weights of 300 to 4000. Faty acid epoxy esters, for example, unsaturated fatty acid esters, such as soya fatty acid esters or tall oil fatty acid esters, generally are made from the medium molecular weight epoxy resins, such as those known as Epon 1004 and Epon 1007. Other resins sometimes included in sheet metal primers include aminoplast resins, such as the urea-formaldehyde resins and melamine-formaldehyde resins known as Uformite F–240 and Resimene 875, and similar alkylated or unalkylated condensation products of an aldehyde and a compound containing at least one —NH₂ group.

Ordinarily, methacrylate lacquers do not adhere well to baked primers of this type, but the compositions herein provide exceptional adhesion as well as other desirable properties.

There are described below a number of examples which illustrate the invention in several of its embodiments; however, the invention is not to be construed as being limited to the details given. For example, cellulose acetate butyrate and plasticizer in the coating composition are not necessary, but are desirable and conventional in commercial applications, therefore, these have been included in the examples. All parts and percentages given in the examples and elsewhere herein are by weight unless otherwise specified. The sheet metal primer employed in the tests described was a commercial dip primer widely used in automobile production; it is based primarily on phthalic alkyd resin containing about 10 percent epoxy resin.

*Example 1*

An interpolymer containing 2.5 percent acid units was prepared by slowly adding a mixture of 975 parts of methyl methacrylate, 25 parts of methacrylic acid and 2.5 parts of catalyst, alpha,alpha'-azobis(isobutyronitrile), to a stirred reaction vessel containing 1500 parts of refluxing toluene. The addition was completed in 2¼ hours; the reaction mixture was refluxed for an additional 6 hours, with additions of 1.25 parts of the above catalyst and 180 parts of toluene being made after each of the second and fourth hours. The cooled product had a Gardner-Holdt viscosity of W–X and an acid number of 5.7.

To 1500 parts of the above interpolymer solution there were added 8.6 parts of 1,2-propylenimine, and this mixture was refluxed for 2½ hours. The product had a total nonvolatile resin solids content of 33.5 percent and an acid number of about 1.

This modified interpolymer was tested by formulating two coating compositions therefrom as follows:

| | Composition A, parts | Composition B, parts |
|---|---|---|
| Interpolymer solution | 118 | 94 |
| Cellulose acetate butyrate solution (20 percent in acetone) | 150 | 150 |
| Butyl benzyl phthalate | 30 | 30 |
| Pigment paste* | | 88 |

*40 parts TiO₂, 8 parts poly(methyl methacrylate) and 40 parts toluene.

These compositions were coated on steel panels having thereon a cured layer of the sheet metal primer described above. The panels were then baked for 15 minutes at 220° F.

Adhesion was measured by a test in which a cross is scribed on the panels with a knife and a pressure-sensitive adhesive tape is firmly pressed on the scribed area. The tape is then pulled away from the coating in a plane nearly parallel to the panel. The amount of coating removed, if any, indicates the degree of adhesion of the coating; this is conventionally expressed as a numerical rating on a scale from 1 (excellent adhesion) to 10 (very poor adhesion). Along with the above panels, comparative panels were prepared in the same manner, except that the interpolymer component of the coating composition was in one instance poly(methyl methacrylate) and in another instance was a copolymer of 90 percent methyl methacrylate and 10 percent lauryl methacrylate, both comparative interpolymers being unmodified. Tested and rated in the above manner, the adhesion of the coating on the panels coated with Compositions A and B each was rated as 1, whereas the adhesion of the coating on the comparative panels was each rated as 10.

The above compositions were also coated on unprimed steel, glass and aluminum; after baking the coating in each instance had outstanding adhesion to the substrate.

Example 2

An interpolymer containing 2.5 percent acid units was prepared and reacted with 1,2-propylenimine, as in Example 1. This interpolymer was blended with a homopolymer of methyl methacrylate, as follows:

|  | Composition A, parts | Composition B, parts |
| --- | --- | --- |
| Imine-modified interpolymer solution (34 percent solids) | 12 | 12 |
| Poly(methyl methacrylate) solution (molecular weight about 110,000; 39 percent in toluene) | 92 | 72 |
| Pigment paste |  | 88 |
| Cellulose acetate butyrate solution (20 percent in acetone) | 150 | 150 |
| Butyl benzyl phthalate | 30 | 30 |

The pigment paste employed in Composition B was made by mixing in a pebble mill 538 parts of $TiO_2$, 103 parts of the above poly(methyl methacrylate) solution, 259 parts of toluene, and 57 parts of Cellosolve acetate; a total of 168 additional parts of the poly(methyl methacrylate) solution and 53 parts of toluene were added in letdowns during the milling. Based upon the total weight of the methacrylate polymers, in each instance the imine-modified polymer represented 10 percent and the poly(methyl methacrylate) 90 percent; the level of acid units (as acid) on the same basis was 0.255 percent.

These coating compositions were tested in the same manner as that of Example 1 with essentially the same results. The compositions were maintained at 140° F. for 10 days and again tested; little or no loss of adhesion could be noted.

Example 3

Using the procedure of Example 1, a copolymer of 99.5 percent methyl methacrylate and 0.5 percent of methacrylic acid was prepared and reacted with propylenimine. The product had a solids content of 35.9 percent and a Gardner-Holdt viscosity of W–X. This imine-modified polymer was formulated in a coating composition, using the pigment paste described in Example 2:

|  | Parts by weight |
| --- | --- |
| Imine-modified interpolymer solution (36 percent solids) | 92 |
| Pigment paste | 88 |
| Cellulose acetate butyrate solution (20 percent in acetone) | 150 |
| Butyl benzyl phthalate | 30 |

When coated on primed steel panels, cured at 200° F. for 20 minutes, and tested in the above manner, this composition had excellent adhesion.

Example 4

An interpolymer was prepared and concurrently reacted with imine, as follows:

A reaction vessel containing 312 parts of toluene was heated to reflux and a mixture of the following was added over a 2-hour period:

|  | Parts by weight |
| --- | --- |
| Methyl methacrylate | 993.75 |
| Butyl methacrylate | 250.0 |
| Methacrylic acid | 6.25 |
| Alpha,alpha'-azobis(isobutyronitrile) | 3.12 |
| Toluene | 156.0 |

After the addition was complete, 938 parts of toluene and 3.12 parts of ethylenimine were added and refluxing was continued for 3 hours, while adding 4.7 parts of the above catalyst and 655 parts of toluene over the first 2 hours. There were then added 263 parts of toluene and the mixture was cooled. The product had a solids content of 34.5 percent, a Gardner-Holdt viscosity of T–U and an acid number of 0.29.

This imine-modified interpolymer was formulated into a coating composition by blending 168 parts of the interpolymer solution with 8 parts of a 20 percent solution of cellulose acetate butyrate in acetone, 22 parts of butyl benzyl phthalate, 22 parts of Cellosolve acetate, 31 parts of acetone, and 124 parts of pigment paste. The pigment paste was made by mixing 39 parts of cellulose acetate butyrate, 100 parts of Cellosolve acetate, 100 parts of toluene, and 161 parts of $TiO_2$, and grinding for 24 hours.

The composition was coated on steel panels primed with sheet metal primer, baked at 220° F. for 15 minutes, and tested as above. The coating had excellent adhesion.

Example 5

A methyl methacrylate dispersion copolymer was produced as follows:

A reaction vessel was charged with:

|  | Parts by weight |
| --- | --- |
| Methyl methacrylate | 24.8 |
| Methacrylic acid | 0.25 |
| Milled natural rubber solution (15.8 percent in lactol spirits) | 35 |
| Aliphatic naphtha | 135 |
| Mineral spirits | 251 |
| Benzoyl peroxide | 1 |

This mixture was heated at 85° C. for 1 hour while sparging with inert gas. After cooling to 60° C., the mixture was strongly agitated while adding thereto over a 25-minute period a mixture of 295 parts of methyl methacrylate, 3 parts of methacrylic acid, 0.75 part of benzoyl peroxide, and 0.75 part of tertiary-dodecyl mercaptan. After this addition, the reaction mixture was heated to 85° C. and maintained at that temperature for 1½ hours, while again sparging with inert gas. The cooled product had a solids content of 56.2 percent.

A portion of the above product was modified by reaction with imine by reducing 300 parts thereof to 35 percent solids content with 188 parts of aliphatic naphtha, adding 1.04 parts of 1,2-propylenimine, and heating to 105° C. to 110° C. for 5 hours. Comparable coating compositions were prepared using the modified and unmodified polymers, as follows:

|  | Composition A, parts | Composition B, parts |
| --- | --- | --- |
| Imine-modified polymer (35 percent solids) | 48.8 |  |
| Unmodified polymer (56.2 percent solids) |  | 30.0 |
| Aliphatic naphtha |  | 18.8 |
| Butyl benzyl phthalate | 10.2 | 10.2 |

Each of these compositions was coated (4 mil film) on primed steel panels and glass panels, and baked at 275° F., the steel panels for 30 minutes and the glass panels for 50 minutes. Adhesion was then tested as above. Each panel coated with Composition A exhibited excellent adhesion, with no film being lifted, while each coating of Composition B was lifted around the cross mark, indicating relatively poor adhesion.

Example 6

The procedure of Example 4 was followed in this example, except that 1250 parts of toluene were charged originally and none was added immediately after the addition. The monomer mixture was as follows:

|  | Parts by weight |
| --- | --- |
| Methyl methacrylate | 1156.25 |
| Hydroxypropyl methacrylate | 75.0 |
| Methacrylic acid | 18.75 |

The reaction with imine was carried out with 9.4 parts of ethyleneimine. The product had a solids content of 35.1 percent, a Gardner-Holdt viscosity of X+, and an acid number of 0.32.

A coating composition was formulated by blending 143 parts of the imine-modified interpolymer solution with 8 parts of 20 percent cellulose acetate butyrate in acetone, 30 parts of butyl benzyl phthalate, 48 parts of acetone, and 22 parts of Cellosolve acetate, along with 124 parts of the pigment paste described in Example 4. This composition, when applied to a primed steel panel and baked for 15 minutes at 220° F., provided a coating of excellent adhesion.

*Example 7*

An interpolymer was prepared by the procedure of Example 1, using a monomer mixture of 950 parts of methyl methacrylate and 50 parts of methacrylic acid, and a solvent mixture of 1000 parts of toluene, 250 parts of 2-propanol and 250 parts of methyl ethyl ketone. The interpolymer solution obtained, which had a Gardner-Holdt viscosity of I to J and an acid number of 11.6, was reacted with 35 parts of 1,2-propylenimine; the product had a total solids content of 38.1 percent and an acid number of 0.33. A black lacquer was formulated from this modified interpolymer using 138 parts of the interpolymer solution (53 parts resin solids), 20 parts of cellulose acetate butyrate, 27 parts of butyl benzyl phthalate and 5 parts of carbon black. When coated on panels and tested in the manner set forth in Example 1, this composition exhibited outstanding adhesion, and especially compared to a similar lacquer based upon a methyl methacrylate polymer vehicle.

*Example 8*

Nine hundred (900) parts of the interpolymer solution as in Example 1 (35 percent solids) were admixed with 0.32 part of ethylenimine and refluxed for 3 hours, thereby reacting about 8 percent by weight of the acidic groups of the interpolymer with imine. About 0.2 percent of acidic groups were reacted, based upon the total weight of interpolymer. When tested in the manner of Example 1, this product had good adhesion compared to compositions produced from the unmodified interpolymer.

The foregoing and other tests have demonstrated that the various imine-modified polymers of alkyl methacrylates as described above all have greatly improved adhesion in both clear and pigmented coatings over primed and unprimed substrates, and particularly over the several types of thermosetting primers described above. Set forth below are examples of a number of other imine-modified interpolymers which have been also found to be advantageous in providing such adherent coatings.

*Example 9*

A reaction vessel was charged with 1650 parts of toluene and heated to reflux. There was added over a period of 2½ hours the following mixture:

| | Parts by weight |
|---|---|
| Methyl methacrylate | 2516.5 |
| Methacrylic acid | 27.5 |
| Lauryl methacrylate | 206.0 |
| Azobis-(isobutyronitrile) | 6.82 |

This mixture was refluxed for 6 hours, with 3.41 parts of the above catalyst and 550 parts of toluene being added after each of the second and fourth hours. Additional toluene was added as needed to maintain the viscosity; a total of 1236 parts of additional toluene were added during the refluxing and 600 parts at the end of the reaction. The interpolymer solution obtained had a solids content of 33.9 percent, a Gardner-Holdt viscosity of V, and an acid number of 2.5. To this solution there were added 14 parts of ethylenimine, and the mixture refluxed for 3 hours. During the last hour, 3 parts of water were removed by azeotropic distillation. The product had a solids content of 34.5 percent and an acid number of 0.5.

*Example 10*

Using a procedure similar to that in Example 9, an interpolymer was produced from the following monomers:

| | Parts by weight |
|---|---|
| Methyl methacrylate | 630 |
| Hexyl methacrylate | 360 |
| Butyl acrylate | 180 |
| Methacrylic acid | 30 |

To the interpolymer there were added 22 parts of 1,2-propylenimine, and after refluxing the mixture for 3 hours, 220 parts of the solvent were distilled off and replaced with fresh solvent. The product had a solids content of 33.5 percent, a Gardner-Holdt viscosity of E to F, and an acid number of 0.2.

*Example 11*

Example 10 was repeated using the following monomer mixture:

| | Parts by weight |
|---|---|
| Methyl methacrylate | 690 |
| Hexyl methacrylate | 360 |
| 2-ethylhexyl acrylate | 120 |
| Methacrylic acid | 30 |

The product, after reaction with 22 parts of 1,2-propylenimine, had a solids content of 33.9 percent, a Gardner-Holdt viscosity of E to F, and an acid number of 0.2.

*Example 12*

A reaction vessel was charged with the following:

| | Parts by weight |
|---|---|
| Toluene | 125 |
| Methyl ethyl ketone | 250 |
| Methyl methacrylate | 472.5 |
| N-(N-morpholinylmethyl)acrylamide | 25.0 |
| Methacrylic acid | 2.5 |
| Azobis-(isobutyronitrile) | 1.25 |

This mixture was refluxed for 6 hours with 200 parts of toluene being added after 1½ hours and 0.63 part of the above catalyst with 125 parts of toluene being added after each of the second and fourth hours. At the end of the reaction period, 105 parts of toluene were added and the mixture cooled. There were then added 1.65 parts of 1,2-propylenimine and the mixture again refluxed for 3 hours. The product had a solids content of 37.1 percent, a Gardner-Holdt viscosity of X to Y, and an acid number of 0.56.

*Example 13*

Using a procedure similar to that of Example 1, an interpolymer was produced from the following mixture:

| | Parts by weight |
|---|---|
| Toluene | 3880 |
| 2-propanol | 2180 |
| Methyl methacrylate | 4241 |
| N-methylol acrylamide | 292 |
| Methacrylic acid | 34 |
| Azobis-(isobutyronitrile) | 22.5 |

The interpolymer solution, which had a solids content of 36.6 percent, a Gardner-Holdt viscosity of K, and an acid number of 2.0, was reacted with 17 parts of ethylenimine to yield a product having an acid number of 0.3.

*Example 14*

Using the procedure of Example 1, an interpolymer was prepared from 975 parts of methyl methacrylate and 25 parts of methacrylic acid, with benzoyl peroxide as the catalyst. Ten (10) parts of catalyst were in the original mixture and 2.5 parts of catalyst were added in each addition (total catalyst was 15 parts). The interpolymer was reacted with 16.7 parts of 1,2-propylenimine. The product had a solids content of 37.1 percent, a Gardner-Holdt viscosity of E–F and an acid number of 0.4.

Example 15

An interpolymer was produced as in Example 1 and modified by reacting 850 parts of the interpolymer solution with 7.5 parts of N-(2-aminoethyl)ethylenimine by refluxing the mixture for 4 hours. The product had a solids content of 35.7 percent, a Gardner-Holdt viscosity of Y, and an acid number of 0.8.

Example 16

A reaction vessel was charged with 300 parts of toluene and heated to reflux. Over a period of 2 hours, there was added a mixture of the following:

| | Parts by weight |
|---|---|
| Methyl methacrylate | 292.5 |
| Methacrylic acid | 7.5 |
| Toluene | 37.5 |
| Azobis-(isobutyronitrile) | 0.75 |

At the end of this addition, 6.3 parts of N-ethyl ethylenimine were added and refluxing was continued while adding a mixture of 1.13 parts of azobis-(isobutyronitrile) and 158 parts of toluene over a period of 3 hours. The mixture was refluxed for 5 more hours, after which 93 parts of toluene were added and 93 parts of solvent were distilled from the reaction mixture. After cooling and the addition of 63 parts of toluene, the product had a solids content of 34.9 percent, a Gardner-Holdt viscosity of S, and an acid number of 0.5.

Example 17

Example 16 was repeated using N-butyl ethylenimine in place of N-ethyl ethylenimine. The product had a solids content of 36.4 percent, a Gardner-Holdt viscosity of M+, and an acid number of 0.2.

Example 18

A reaction vessel was charged with 625 parts of toluene and heated to reflux. The following were then added over a period of 1.75 hours:

| | Parts by weight |
|---|---|
| Methyl methacrylate | 1237.5 |
| Methacrylic acid | 12.5 |
| Azobis-(isobutyronitrile) | 3.12 |
| Toluene | 156.0 |

After the addition was completed, 375 parts of toluene and 6.25 parts of ethylenimine were added. Over a period of about 3 hours, there was then added a mixture of 4.7 parts of the above catalyst, 354 parts of toluene and 302 parts of acetone. After the further addition of 510 parts of acetone, the product had a solids content of 37.8 percent, a Gardner-Holdt viscosity of U–V, and an acid number of 0.3.

Example 19

Using a procedure similar to that of Example 18, an interpolymer of 292.5 parts of methyl methacrylate and 7.5 parts of methacrylic acid was prepared in toluene as the solvent. A total of 3 parts of catalyst was employed. The interpolymer was reacted, during the polymerization, with 6.2 parts of 1,1-dimethyl ethylenimine. The product had a solids content of 34.8 percent, its Gardner-Holdt viscosity was V—, and its acid number was 0.25.

In all the above examples, it was found that coating compositions formulated from the described modified interpolymers provided coatings with marked improvement in adhesion over various substrates compared to conventional methyl methacrylate lacquer compositions. These substrates include glass, aluminum, steel, and the various thermosetting primers mentioned.

Similarly advantageous results are obtained by the use in a similar manner of other interpolymers and blends of polymers from various combinations of monomers of the class described, modified with the imines of the above examples, or with the other imines mentioned above, or others as disclosed herein.

It should be noted that, while there is described herein the improvement in adhesion attained by the compositions of this invention, these compositions also have the other highly desirable properties characteristic of methacrylate coatings. These include, for example, durability, gloss, abrasion and impact resistance, humidity resistance, and the like.

According to the provisions of the patent statutes, there are described above the invention and what are now considered to be its best embodiments. However, within the scope of the appended claims, it is to be understood that the invention can be practiced otherwise than as specifically described.

We claim:

1. A coating composition based on methacrylate polymer containing at least about 50 percent by weight of lower alkyl methacrylate in polymerized form, said composition containing at least about 0.1 percent by weight, based upon the weight of methacrylate polymer, of vinyl polymerized carboxylic acid units which have been reacted with an imine of the formula:

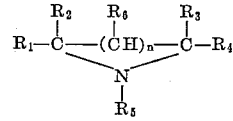

where $R_1$, $R_2$, $R_3$, $R_4$ and $R_5$ are each selected from the group consisting of hydrogen, alkyl, aryl, alkaryl and aralkyl, $R_6$ is selected from the group consisting of hydrogen and lower alkyl, and $n$ is an integer from 0 to 1.

2. The coating composition of claim 1 in which said lower alkyl methacrylate is methyl methacrylate.

3. The coating composition of claim 1 in which said acid units are derived from an ethylenically unsaturated acid of from 3 to 6 carbon atoms and from 1 to 2 carboxyl groups, and said imine is an ethylenimine or 1,2-propylenimine.

4. An interpolymer of (1) from about 30 percent to about 99.9 percent by weight of a lower alkyl methacrylate, (2) at least about 0.1 percent by weight of ethylenically unsaturated carboxylic acid, and (3) from about 0 percent to about 69.9 percent by weight of at least one other ethylenically unsaturated monomer copolymerizable with said methacrylate and said acid, said interpolymer having at least about 0.1 percent by weight of acidic carboxyl groups thereof reacted with an imine of the formula:

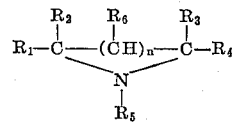

where $R_1$, $R_2$, $R_3$, $R_4$ and $R_5$ are each selected from the group consisting of hydrogen, alkyl, aryl, alkaryl and aralkyl, $R_6$ is selected from the group consisting of hydrogen and lower alkyl, and $n$ is an integer from 0 to 1.

5. The interpolymer of claim 4 in which said lower alkyl methacrylate is methyl methacrylate and said unsaturated carboxylic acid has from 3 to 6 carbon atoms and 1 to 2 carboxyl groups.

6. A coating composition containing organic solvent and dissolved therein cellulose acetate butyrate, plasticizer and the interpolymer of claim 4.

7. The interpolymer of claim 4 in which said lower alkyl methacrylate is methyl methacrylate and said other ethylenically unsaturated monomer is an alkyl ester of an acrylic acid, said ester having from 2 to 20 carbon atoms in the alkyl group.

8. The interpolymer of claim 4 which contains (1) from about 30 percent to about 99.9 percent by weight of methyl methacrylate, (2) from about 0.1 percent to about 10 percent by weight of ethylenically unsaturated carboxylic acid having 3 to 6 carbon atoms and 1 to 2 carboxyl groups, and (3) from about 0 percent to about 69.9 percent by weight of at least one other ethylenically unsaturated monomer copolymerizable with methyl methacrylate and said acid, said interpolymer having at least about 0.1 percent by weight of acidic carboxyl groups thereof reacted with an ethylenimine or 1,2-propylenimine.

9. A coating composition having as a film-forming component thereof a blend of (a) a polymer of a lower alkyl methacrylate and (b) the interpolymer of claim 4 wherein sufficient acidic carobxyl groups have been reacted with imine to comprise at least about 0.1 percent of the total weight of said blend.

10. A coated article comprising a solid substrate having theron an adherent layer of the coating composition of claim 1.

11. A coated article comprising a solid substrate having thereon an adherent layer of a coating composition in which the film-forming component comprises the interpolymer of claim 4.

12. A coated article comprising a solid substrate having thereon an adherent layer of the coating composition of claim 9.

13. A coated article comprising a metal substrate having thereon a thermoset primer coating and superimposed on said primer coating an adherent layer of the coating composition of claim 1.

14. The coated article of claim 13 in which said thermoset primer coating is comprised of an alkyd resin.

15. A method of modifying an interpolymer of a lower alkyl methacrylate and at least one other copolymerizable ethylenically unsaturated monomer, said interpolymer containing at least about 0.1 percent by weight of ethylenically unsaturated carboxylic acid, which comprises reacting said interpolymer with an imine of the formula:

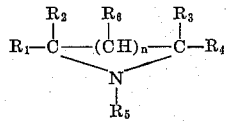

where $R_1$, $R_2$, $R_3$, $R_4$ and $R_5$ are each selected from the group consisting of hydrogen, alkyl, aryl, alkaryl and aralkyl, $R_6$ is selected from the group consisting of hydrogen and lower alkyl, and $n$ is an integer from 0 to 1.

16. The method of claim 15, in which said lower alkyl methacrylate is methyl methacrylate, said unsaturated carboxylic acid has from 3 to 6 carbon atoms and from 1 to 2 carboxyl groups, and said imine is an ethylenimine or 1,2-propylenimine.

17. A method of producing an imine-modified interpolymer which comprises vinyl polymerizing monomers comprising a lower alkyl methacrylate and at least about 0.1 percent based upon the total weight of monomers of copolymerizable ethylenically unsaturated carboxylic acid in the presence of a free-radical catalyst, and mixing the polymerization mixture, prior to the completion of the polymerization reaction with an imine of the formula:

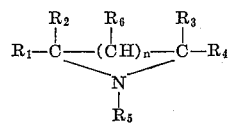

where $R_1$, $R_2$, $R_3$, $R_4$ and $R_5$ are each selected from the group consisting of hydrogen, alkyl, aryl, alkaryl and aralkyl, $R_6$ is selected from the group consisting of hydrogen and lower alkyl, and $n$ is an integer from 0 to 1.

18. The method of claim 17 in which said free-radical catalyst is alpha,alpha'-azobis(isobutyronitrile).

19. The method of claim 17 in which said lower alkyl methacrylate is methyl methacrylate, said unsaturated carboxylic acid has from 3 to 6 carbon atoms and from 1 to 2 carboxyl groups, and said imine is an ethylenimine or 1,2-propylenimine.

References Cited by the Examiner

UNITED STATES PATENTS

| | | | |
|---|---|---|---|
| 2,261,294 | 11/1941 | Schlack | 8—116.2 |
| 2,615,845 | 10/1952 | Lippincott et al. | 260—78 |
| 2,830,045 | 4/1958 | Leumann et al. | 260—2 |
| 3,079,358 | 2/1963 | Uelzmann | 260—901 |

MURRAY TILLMAN, *Primary Examiner.*

J. WHITE, *Assistant Examiner.*